Aug. 12, 1924.
E. N. BALDWIN
1,504,312
SECONDARY STORAGE BATTERY
Filed Dec. 6, 1922
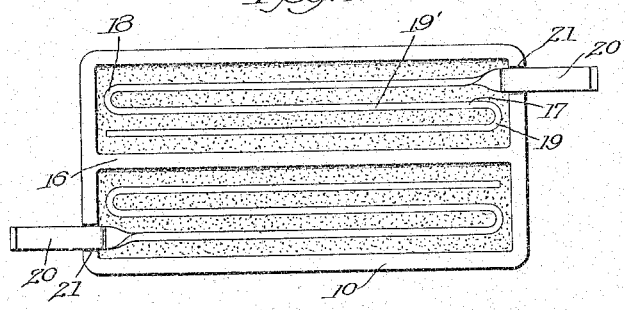
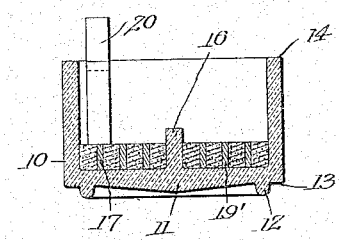
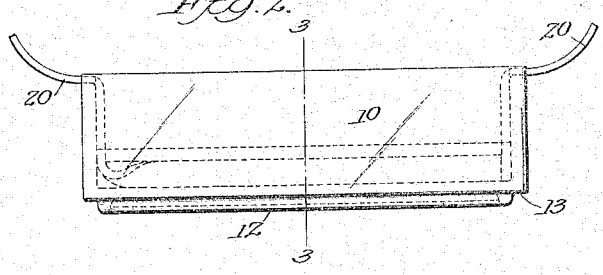
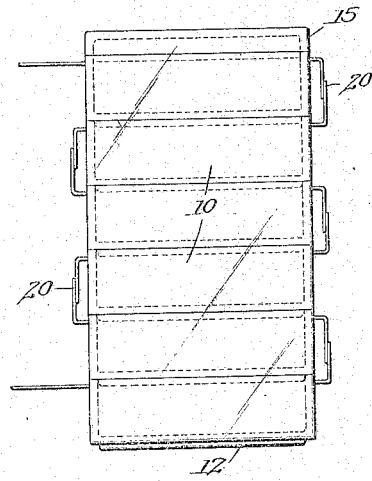
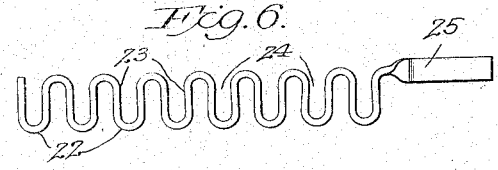
Inventor
E. N. Baldwin.
By Cushman Bryant & Darby
Attorneys Patented Aug. 12, 1924.

1,504,312

UNITED STATES PATENT OFFICE.

EUGENE N. BALDWIN, OF DONORA, PENNSYLVANIA.

SECONDARY STORAGE BATTERY.

Application filed December 6, 1922. Serial No. 605,201.

*To all whom it may concern:*

Be it known that I, EUGENE N. BALDWIN, a citizen of the United States, residing at Donora, in the county of Washington and State of Pennsylvania, have invented new and useful Improvements in Secondary Storage Batteries, of which the following is a specification.

This invention relates to secondary electric batteries of the type used generally in radio transmission and known as B batteries.

An object of the invention is to provide a battery in which the paste will not separate from the lead plates or elements incorporated in each cell whereby the life of the battery will be materially lengthened.

A further object of the invention is to improve the construction and to arrange the cells in such a way that a compact and highly efficient structure is obtained.

Other objects of the invention will become obvious as the description proceeds in connection with the embodiment of the invention disclosed in the accompanying drawings, wherein—

Fig. 1 is a top plan view of a cell.

Fig. 2 is a side elevational view.

Fig. 3 is a cross section on the line 3—3 of Fig. 2.

Fig. 4 is a side elevational view showing a plurality of the cells in superimposed relation.

Fig. 5 is an end view of the arrangement shown in Fig. 4, and

Fig. 6 is a detail view disclosing a modified electrode construction.

Referring to the drawings for a more detailed description, like numerals designating corresponding parts throughout the several views, 10 indicates a cell container or casing in the shape of a substantially rectangular vessel having a bottom 11, the outer surface of which is inclined towards the center from the edges and is provided with a substantially continuous rib 12. The cells are adapted to be superimposed, as shown in Figs. 4 and 5, with the rib 12 of each cell fitting into the underneath cell and the marginal surface 13 outside the rib resting upon the top edge 14 of the underneath container. By inclining the under surface as indicated, the drops of the liquid electrolyte from the cells thrown upwardly when the bubbles of gas come to the top of the liquid are drained away from the meeting surface of the two containers, and the rib 12 serves as an additional seal to prevent the exit of the moisture and liquid electrolyte. The top cell, when the cells are arranged in stacks, as shown in Figs. 4 and 5, may be provided with a suitable cover 15, and the cells may be arranged in single columns, as indicated, or a plurality of stacks may be associated side by side or end to end.

Upon its interior the container is divided by a partition wall 16 into two compartments, although obviously the number of compartments may be varied by adding other walls. In each compartment is positioned an electrode formed of a lead strip 17 having a plurality of bends 18 and 19, the intermediate parallel portions 19′ of the strip between the bends being located in substantial parallelism, and the entire strip being positioned upon edge on the bottom of the vessel. The strip has an upwardly extending terminal portion 20, which projects through an opening 21 to the exterior of the cell.

The spaces between the parallel portions 19′ of the electrodes are filled with suitable co-acting paste-like material; as is customary, in one compartment yellow oxide of lead is employed, and in the other, red oxide of lead, to form positive and negative compartments.

The paste covers the bottom of the compartment and is sufficiently deep to be substantially flush or even with the top edges of the electrode strips, leaving the top surfaces of the strips uncovered. It will be noted that the partition wall is substantially higher than the electrodes to avoid short circuiting within the cell, and the usual liquid electrolyte is incorporated in the vessel.

Referring to Fig. 6, there is disclosed a modified electrode construction. In this form, the electrode is formed of a strip of lead having a plurality of bends 22, the intermediate portions 23 of the strip between the bends being parallel and extending transversely of the strips to provide a plurality of spaces 24 adapted to receive the paste. This electrode has a terminal portion 25 adapted to project through a suitable opening provided in the container wall.

In using a battery formed of a plurality of cells of the character disclosed, it will be found that there is a substantially permanent contact between the paste and the lead strips, thus insuring a battery of durable construction. Should the paste thin in any way, it cannot separate from the electrode strips, for the reason that both are located directly upon the bottom of the vessel, and the bends in the strip insure the retention of contact between the paste and the strip. The container may be made of any suitable insulated material, such as celluloid, compressed paper coated with a bituminous compound, or glass. By leaving the upper edges of the electrode strips uncovered, the gas formation may be taken off without having a disturbing effect upon the paste between the bends in the strip, and the higher partition affords an effective barrier against short circuits.

It should be understood that the invention is not limited to the exact details disclosed in the accompanying drawing, but that such modifications may be made in the illustrated and described structure as come within the scope of the invention, which is more definitely defined in the following claims.

I claim:

1. In a battery of the class described, a vessel divided by a partition-wall into compartments, a metallic electrode strip bent back and forth upon itself and resting edgewise upon the bottom of the vessel, each electrode having a connector and extending to the exterior of the vessel, and suitable paste-like coacting materials in each compartment between the portions of the strips.

2. In a battery of the class described, a vessel divided by a partition-wall into compartments, a metallic electrode strip in each compartment having a plurality of transverse bends and resting edgewise upon the bottom of the vessel, each electrode having a connector and extending to the exterior of the vessel, the top edges of the electrode being below the top of the partition, and suitable paste-like coacting materials in each compartment between the portions of each strip.

3. In a battery of the class described, a vessel divided by a partition-wall into compartments, a metallic electrode strip in each compartment having a plurality of transverse bends and resting edgewise upon the bottom of the vessel, each electrode having a connector and extending to the exterior of the vessel, the top edges of the electrode being below the top of the partition, and suitable paste-like coacting materials in each compartment between the portions of each strip,—said materials filling the vessel to a point substantially flush with the top edges of the strips.

4. In a battery of the class described, a vessel divided by a partition wall into compartments and having the outer surface of its bottom inclined from the edge of the same toward its center.

5. In a battery of the class described, a vessel divided by a partition wall into compartments and having the outer surface of its bottom inclined from the edge of the same toward its center and provided with a continuous rib spaced from the edge of the vessel.

6. In a battery of the class described, a vessel divided by a partition wall into compartments and a metallic electrode in each compartment formed of a strip transversely bent back and forth upon itself and resting edgewise upon the bottom of the vessel.

7. In a battery of the class described, a vessel divided by a partition wall into compartments and a metallic electrode in each compartment formed of a strip transversely bent back and forth upon itself and resting edgewise upon the bottom of the vessel, said strips having terminal portions extending to the exterior of the vessel.

In testimony whereof I have hereunto set my hand.

EUGENE N. BALDWIN.